US008824090B2

(12) United States Patent
Langlais et al.

(10) Patent No.: US 8,824,090 B2
(45) Date of Patent: Sep. 2, 2014

(54) METHODS AND DEVICES FOR COMPENSATING FOR OFF-TRACK MOTION

(75) Inventors: Timothy E Langlais, Minneapolis, MN (US); Ju-IL Lee, Eden Prairie, MN (US); Frank W Bernett, Longmont, CO (US); Chiyun Xia, Prior Lake, MN (US)

(73) Assignee: Seagate Technology LLC, Cupertino, CA (US)

( * ) Notice: Subject to any disclaimer, the term of this patent is extended or adjusted under 35 U.S.C. 154(b) by 168 days.

(21) Appl. No.: 13/300,920

(22) Filed: Nov. 21, 2011

(65) Prior Publication Data
US 2013/0128380 A1 May 23, 2013

(51) Int. Cl.
G11B 21/02 (2006.01)
G11B 5/55 (2006.01)
G11B 5/596 (2006.01)

(52) U.S. Cl.
CPC .......... *G11B 5/5582* (2013.01); *G11B 5/59694* (2013.01)
USPC .......................................................... 360/75

(58) Field of Classification Search
USPC ................ 360/75, 55, 77.02, 78.04, 78.13
See application file for complete search history.

(56) References Cited

U.S. PATENT DOCUMENTS

| 5,426,545 | A  | * | 6/1995  | Sidman et al. ............. 360/78.09 |
| 5,721,457 | A  |   | 2/1998  | Sri-Jayantha et al. |
| 6,115,200 | A  | * | 9/2000  | Allen et al. ..................... 360/60 |
| 6,496,320 | B1 | * | 12/2002 | Liu ................................ 360/75 |
| 6,674,600 | B1 | * | 1/2004  | Codilian et al. ................ 360/75 |
| 6,914,743 | B1 | * | 7/2005  | Narayana et al. .......... 360/77.08 |
| 7,035,034 | B2 |   | 4/2006  | Semba et al. |
| 7,633,704 | B2 |   | 12/2009 | Supino et al. |
| 7,724,457 | B2 |   | 5/2010  | Dang et al. |
| 2004/0200270 | A1 | * | 10/2004 | Irmer et al. ..................... 73/116 |
| 2004/0264028 | A1 | * | 12/2004 | Ishii et al. ....................... 360/69 |
| 2007/0030768 | A1 | * | 2/2007  | Semba et al. ................... 369/43 |
| 2007/0183076 | A1 | * | 8/2007  | Baugh et al. .................... 360/75 |
| 2010/0061007 | A1 | * | 3/2010  | Matsushita et al. ............. 360/68 |
| 2010/0067357 | A1 |   | 3/2010  | Huang et al. |
| 2010/0265615 | A1 | * | 10/2010 | Yamaguchi et al. ....... 360/99.12 |
| 2013/0250451 | A1 | * | 9/2013  | Huang et al. .................... 360/75 |

FOREIGN PATENT DOCUMENTS

WO 2011024631 3/2011

* cited by examiner

*Primary Examiner* — Tan X Dinh
(74) *Attorney, Agent, or Firm* — Braden Katterheinrich

(57) ABSTRACT

In certain embodiments, a method includes sensing a mode of a motor-base assembly's response to vibration. Based on the sensed response, the method includes adjusting a head-suspension assembly to compensate for off-track motion caused by the vibration.

In certain embodiments, an apparatus includes a sensor positioned on a basedeck such that the sensor senses a mode of the motor-base assembly's response to linear vibration.

18 Claims, 6 Drawing Sheets

METHODS AND DEVICES FOR COMPENSATING FOR OFF-TRACK MOTION

SUMMARY

Certain embodiments of the present invention are generally directed to devices and methods for compensating for off-track motion.

In certain embodiments, a method includes sensing a mode of a motor-base assembly's response to vibration. Based on the sensed response, the method includes adjusting a head-suspension assembly to compensate for off-track motion caused by the vibration.

In certain embodiments, an apparatus includes a sensor positioned on a basedeck such that the sensor senses a mode of the motor-base assembly's response to linear vibration.

DETAILED DESCRIPTION

The present disclosure relates to devices, systems, and methods for compensating for off-track motion caused by vibration. Data storage devices, like a hard disc drive, can be provisioned with a rotatable medium to which data are stored along a number of concentric tracks. A voice coil motor (VCM) actuates a head suspension assembly (HSA), which allows precise positioning of a data read/write transducer over the tracks by allowing the transducer to move along multiple axes over the media. However, as track density increases with increased storage capacities, it becomes more difficult to stay on-track during read/write operations. This difficulty is amplified when the drive is subject to internal and external vibrations, which cause the transducer to shift off-track. Off-track motion affects the ability of the read/write transducer to write to and read from the desired track.

Some improvements can be recognized by mechanical design improvements in or around the drive that mitigate the effects of vibration, but these design improvements can be constrained by costs. Further attempts have used multiple sensors to measure the vibration that the drive is subject to. But, these attempts only measure the vibration itself, not the drive's response to the vibration. When measuring the vibration itself, it is difficult to create a model/relationship between the vibration the drive is being subjected to and the effects that vibration has at the transducer—the off-track motion. Moreover, each drive has a unique response when subjected to vibration, so just measuring the vibration will not correct for differences between each drive. Whereas, when measuring the response to the vibration, a direct relationship between the response and off-track motion can be calculated and used to compensate for the off-track motion due to vibration on each drive individually.

Certain embodiments of the present disclosure are accordingly directed to devices and methods for compensating for off-track motion caused by vibration by measuring a structure's response to vibration, rather than the vibration itself.

Figure 1:
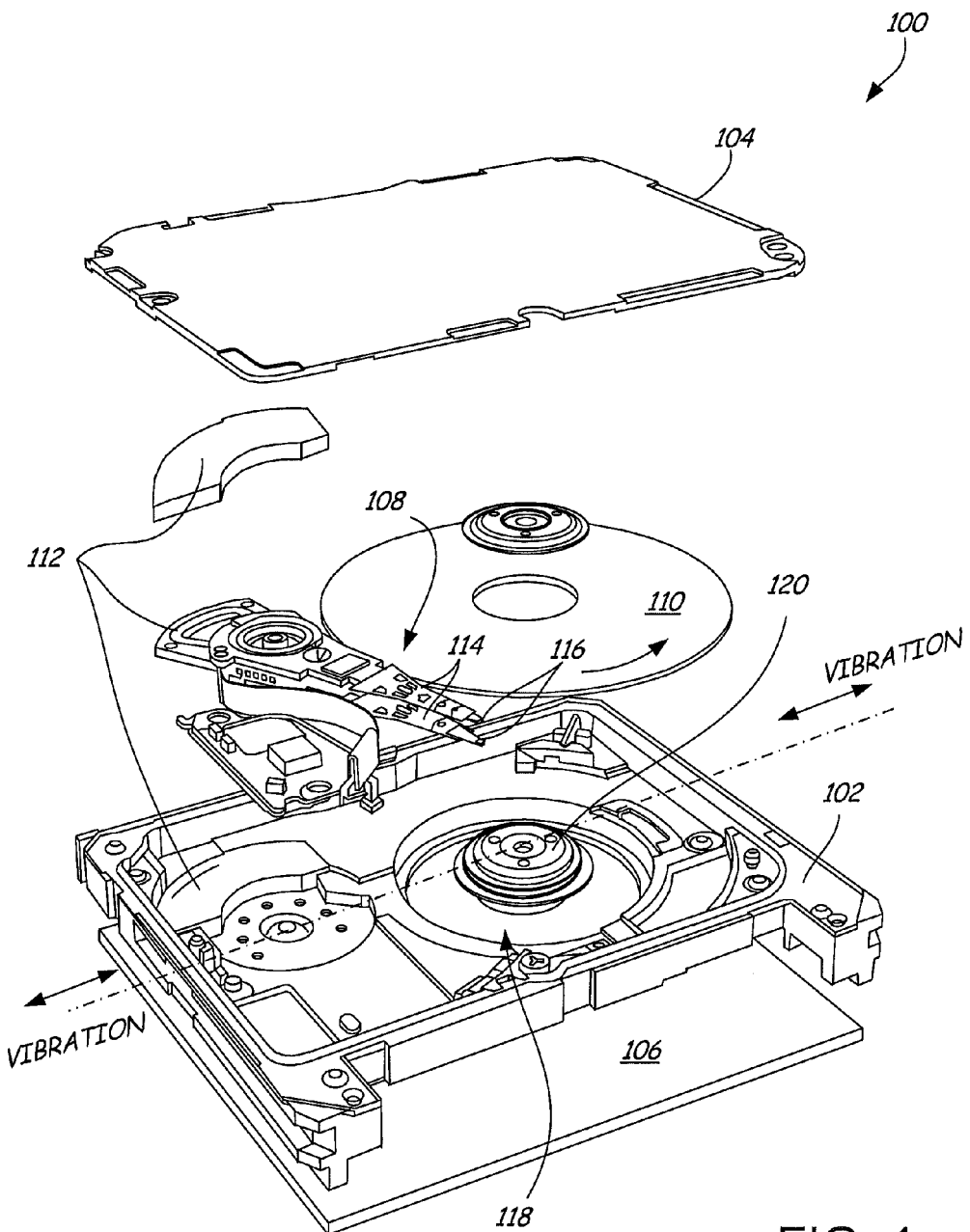
FIG. 1 provides an exploded, isometric view of an exemplary disc drive.

FIG. 1 provides an exploded, isometric view of an exemplary disc drive 100. The drive 100 includes a motor-base assembly 118, top cover 104, printed-circuit board (PCB) 106, head-suspension assembly (HSA) 108, rotatable media 110, and voice coil motor assembly (VCM) 112. The HSA 108 includes a suspension 114 and a read/write head or transducer 116. The motor-base assembly (MBA) portion 118 includes the basedeck 102 and a motor 120.

As shown in FIG. 1, the drive 100 can be subjected to external vibration (shown in phantom lines). This vibration can come from a cabinet containing several other operating drives in which the drive is placed, among other sources. The external vibration can cause disturbances resulting in off-track motion, which causes errors like track misregistration when writing/reading to and from the media 110. These and other errors can be reduced with the following systems, devices, and methods.

Figure 2:
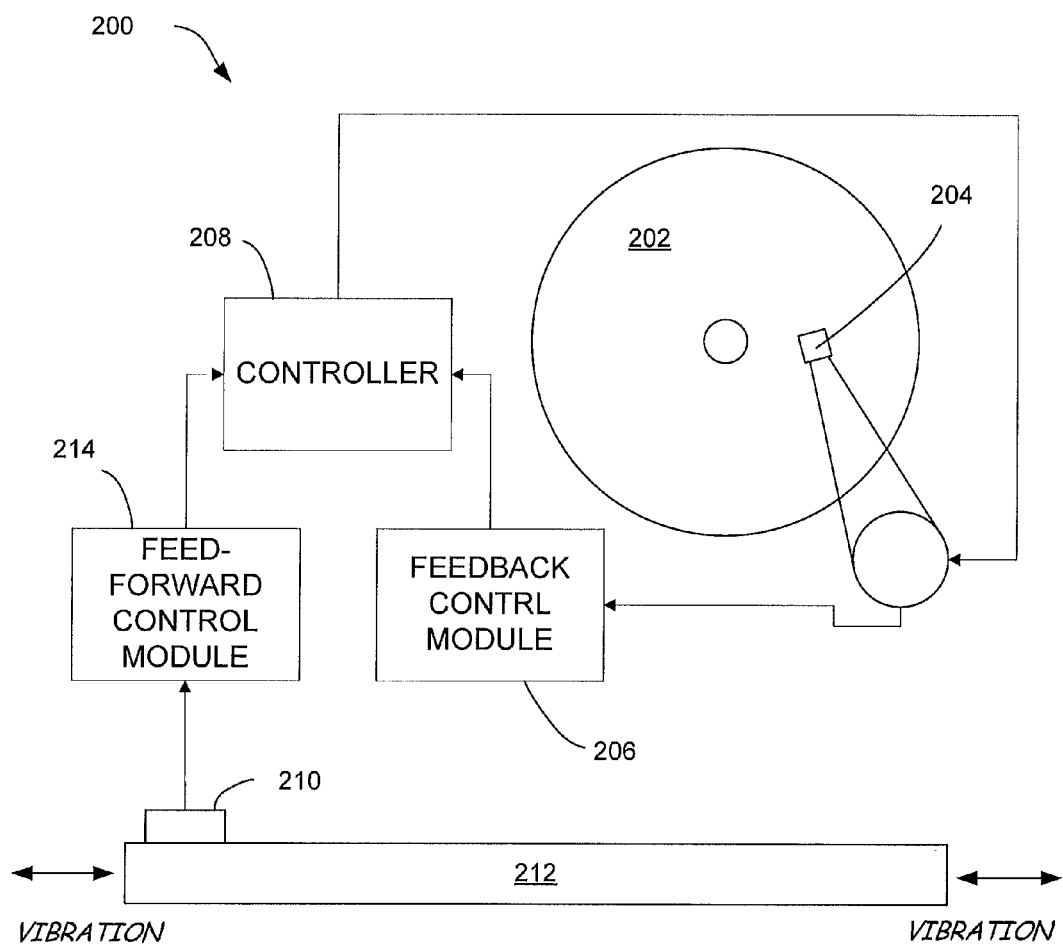
FIG. 2 provides a block diagram of an exemplary control system of a disc drive, in accordance with certain embodiments of the present disclosure.

FIG. 2 provides a block diagram of a system 200 for sensing a basedeck's or motor-base assembly's structural response to vibration and for correcting for off-track motion caused by the vibration. During operation, a recording medium 202 rotates and the position of a read/write head 204 relative to a given track on the recording medium 202 is sensed (e.g., from servo data on the recording medium 202) and compared to a reference positioned (desired position) of the head 204 to generate a position error signal (PBS). The PES is indicative of the difference between the actual and desired positions of the head 204, and is provided to a feedback control module 206. The feedback control module 206 responds to the PES to generate a servo control signal. The servo control signal is combined with a feed-forward signal to generate a combined control signal, which is used by a controller 208 to control a voice coil motor and therefore the position of the head 204 over the recording medium 202.

The system 200 includes a sensor 210 that senses a structural response of the basedeck 212 or motor-base assembly. An example response can include deformation resulting from external vibration. As will be described further with FIG. 3, the sensor 210 can sense specific modes of vibration present in the structure's response (i.e., a modal response), thereby targeting specific causes of off-track motion. The sensing signal is processed inside the feed-forward control module 214 and manipulated to generate the feed-forward signal, which is combined with the feedback control signal. The controller 208 uses the combined control signal to position the head 204 over the desired track on the recording medium 202. The sensor 210 is positioned on the basedeck 212 such that the sensor 210 can sense a response that has a direct relationship between the vibrational response of the basedeck or motor-base assembly and the resulting off-track motion. The response, and therefore the direct relationship, can be used to compensate for the off-track motion with the combined control signal.

Figure 3:
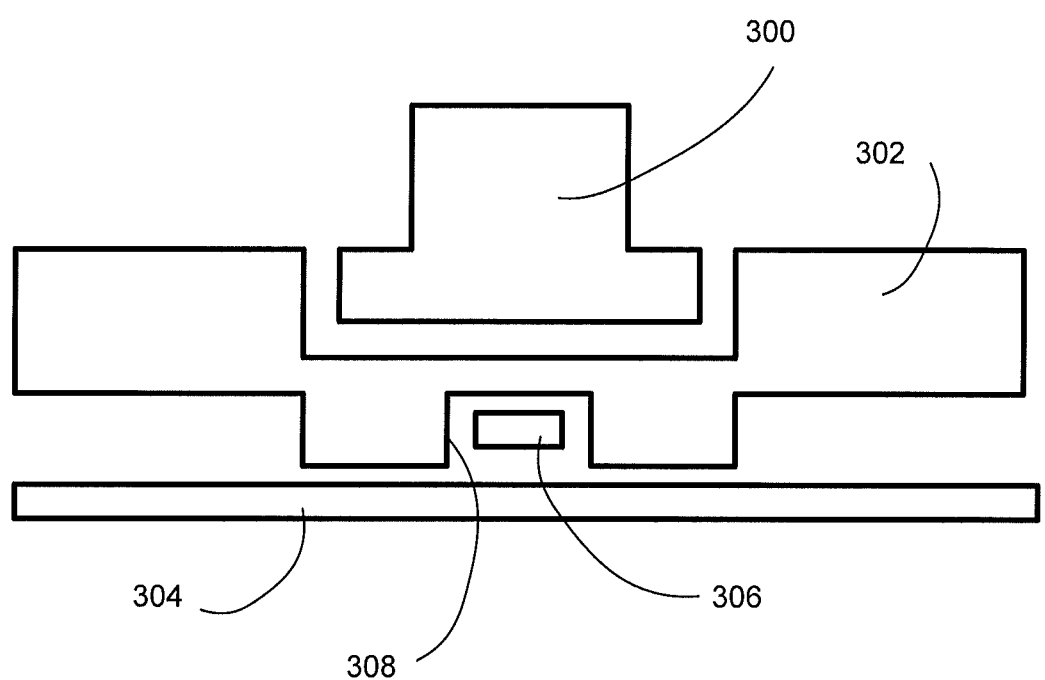
FIG. 3 provides an exploded, side view of a portion of an exemplary storage device, in accordance with certain embodiments of the present disclosure.

FIG. 3 provides an exploded side view of a portion of an exemplary storage device, including a motor 300, basedeck 302, printed circuit board 304, and a sensor 306. The basedeck 302 has a motor cup portion 308, where the sensor 306 is positioned. The sensor 306 can be an accelerometer, strain gauge, or piezo-electric sensor, among other types of sensors adapted to sense a structure's response to vibration. When the sensor 306 is positioned in the motor cup portion 308, the sensor 306 can sense the response of the motor-base assembly (MBA) (300 and 302). The response to vibration of the motor 300 involves deformation of the motor cup portion 308, which can be sensed by placing the sensor 306 in the motor cup portion 308. By sensing the response of the MBA, the actual motion of the MBA during vibration can be measured. In turn, a direct relationship between the response and off-track motion can be calculated and used to compensate for the off-track motion of a transducer due to linear vibration.

More specifically, the sensor may sense specific modes of vibration. A single mode of vibration has a series of resonant responses at frequencies of a whole multiple of the lowest and fundamental resonance frequency. When sensing a specific mode, a specific frequency range can be targeted. For example, a frequency range of 1 kHz to 4 kHz can be targeted when sensing a basedeck vibration mode caused by external vibration. Similarly, a specific frequency range can be targeted for a basedeck vibration mode caused when a basedeck is excited by seek energy from a head-suspension assembly moving from track to track. By focusing on a specific frequency range, other modes can be ignored by the sensor 306 and/or specifically filtered out of the sensor's signal. This approach differs from other attempts that assume no modes and simply sense general vibration and assume a rigid body model to predict a correction/relationship between the vibration and off-track motion.

Figure 4:
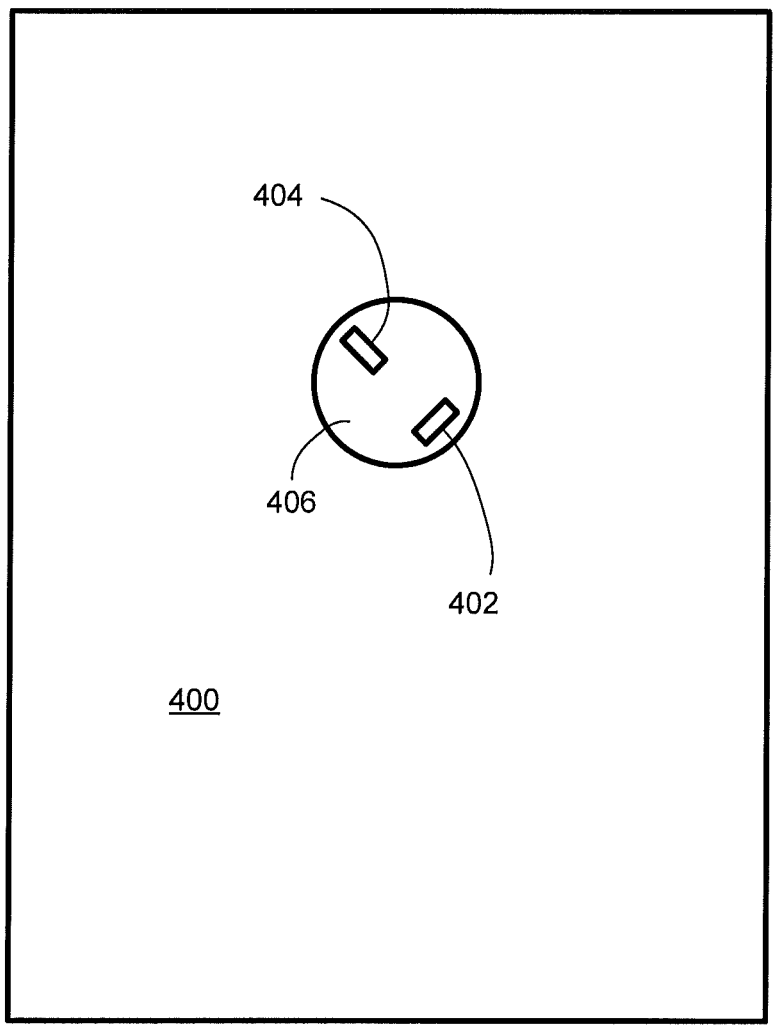
FIG. 4 provides a bottom view of a portion of an exemplary storage device, in accordance with certain embodiments of the present disclosure.

In certain embodiments, a system for compensating for off-track motion caused by vibration can include multiple sensors. As shown in FIG. 4 in a bottom view of a portion of an exemplary storage device's basedeck 400, a first sensor 402 and a second sensor 404 are positioned on a basedeck 400 in a motor-cup portion 406. The sensors 402, 404 can be an accelerometer, strain gauge, or piezo-electric sensor, among other types of sensors adapted to sense a structure's response to vibration. When the sensors 402, 404 are positioned in the motor-cup portion 406, the sensors 402, 404 can sense the response within the motor-cup portion 406 as the motor cup deforms in response to external vibration. By sensing the response, the actual motion of the motor-cup portion 406 during vibration can be measured. In turn, a direct relationship between the response and off-track motion can be calculated and used to compensate for the off-track motion at a transducer due to vibration.

Each sensor can sense one dimension of the response. As such, with two sensors the system can sense two dimensions of a single mode or one dimension of two different modes. Additional and/or more complex sensors can be added to satisfy additional sensing needs.

Figure 5:
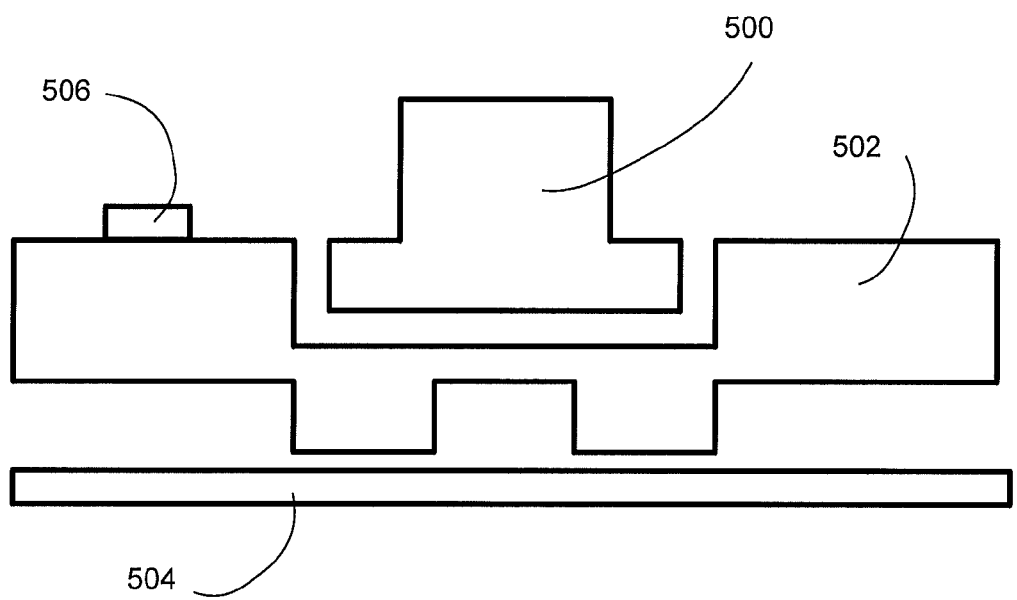
FIG. 5 provides an exploded side view of a portion of an exemplary storage device, in accordance with certain embodiments of the present disclosure.

FIG. 5 provides an exploded side view of a portion of an exemplary storage device, including a motor 500, basedeck 502, printed circuit board 504, and a sensor 506. The sensor 506 is positioned on the top of the basedeck 502 and can be an accelerometer, strain gauge, or piezo-electric sensor, among other types of sensors adapted to sense a structure's response to vibration. When the sensor 506 is positioned on top of the basedeck 502, the sensor 506 can sense the structural response of the basedeck 502 to vibration. The basedeck's response to linear vibration can include specific modes, like those excited by seek energy resulting from a head-suspension assembly moving from track to track. By sensing the resonance of the basedeck 502, the actual motion of the basedeck 502 during vibration can be measured. In turn, a direct relationship between the response and off-track motion can be calculated and used to compensate for the off-track motion of a transducer due to vibration.

Figure 6:
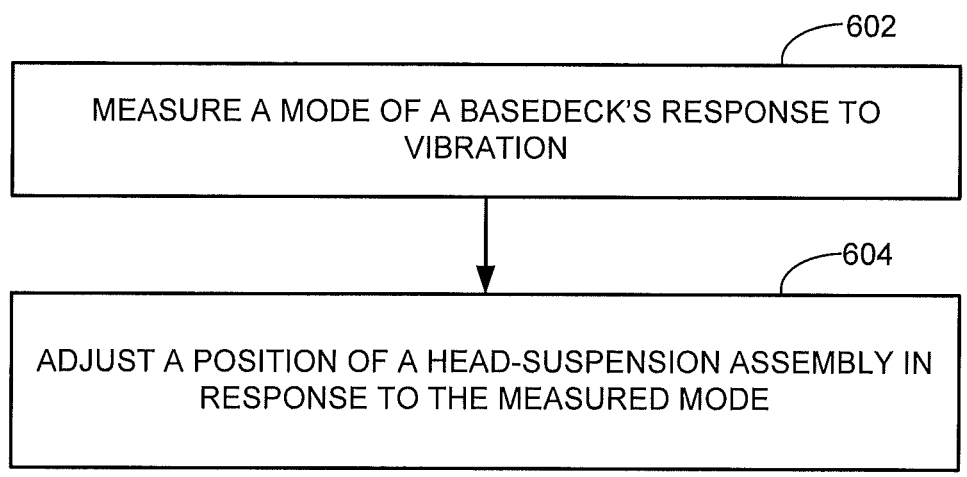
FIG. 6 provides a routine illustrative of steps carried out in accordance with certain embodiments of the present disclosure.

FIG. 6 provides a routine illustrative of steps carried out in accordance with certain embodiments of the present disclosure. In step 600, a mode of a basedeck's response to vibration is measured. Based on the measured response, a position of a head-suspension assembly is adjusted to compensate for off-track motion caused by the vibration (step 602) by providing an appropriate current to VCM in a feed-forward manner. The basedeck's response can include, but without limitation, responses due to seek energy caused by a head-suspension assembly moving from track to track and responses due to deformation of a motor-base assembly caused by external vibration. Additional steps can include measuring multiple modes and/or dimensions with multiple sensors, as discussed in the description of FIG. 5.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed.

What is claimed is:

1. A method comprising:
   sensing a motor-base assembly's structural response to vibration, the structural response including deformation of the motor-base assembly in response to the vibration; and
   based on the sensed structural response, adjusting a head-suspension assembly to compensate for off-track motion caused by the vibration,
   wherein the motor-base assembly includes a basedeck and motor.

2. The method of claim 1, wherein a sensor senses the structural response and the sensor is positioned on the basedeck of the motor-base assembly.

3. The method of claim 2, wherein the sensor is one of an accelerometer, strain gauge, or piezo-electric sensor.

4. The method of claim 1, wherein the vibration is linear vibration.

5. The method of claim 2, further comprising:
   sensing a first mode of the motor-base assembly's structural response to vibration using a first sensor; and
   sensing a second mode of the motor-base assembly's structural response to vibration using a second sensor.

6. The method of claim 5, wherein each sensor senses a single dimension.

7. The method of claim 1, further comprising:
   sensing a first dimension of a mode of the structural response with a first sensor; and
   sensing a second dimension of the mode with a second sensor.

8. The method of claim 7, wherein the mode is a mode excited by seek energy of a head-suspension assembly moving from one track to another.

9. The method of claim 2, wherein the sensor is positioned on a motor cup portion of the basedeck.

10. The method of claim 2, wherein the sensor is positioned on the top of the basedeck.

11. An apparatus comprising:
    a sensor positioned on a basedeck such that the sensor senses a motor-base assembly's deformation in response to linear vibration; and
    a controller that uses the sensed deformation to correct off-track motion of a read/write head.

12. The apparatus of claim 11, wherein the sensor is positioned on a motor cup portion of the basedeck.

13. The apparatus of claim 12, further comprising:
a second sensor positioned on the basedeck such that the second sensor senses a second mode of the motor-base assembly's response to linear vibration.

14. The apparatus of claim 13, wherein each sensor senses a single dimension of the motor-base assembly's response to linear vibration.

15. A system comprising:
a controller that responds to a position error signal and a sensing signal representative of a sensed mode of vibration of a motor-base assembly's structural response to linear vibration, the motor-base assembly including a basedeck and motor,
wherein the controller adjusts a position of a read/write head in response to the position error signal and sensing signal.

16. The system of claim 15, further comprising multiple sensors, each sensor sensing a single dimension.

17. The apparatus of claim 16, wherein the multiple sensors are positioned on the basedeck of the motor-base assembly.

18. The system of claim 17, wherein the multiple sensors are positioned on a motor cup portion of the basedeck of the motor-base assembly.

* * * * *